United States Patent [19]
Serfling et al.

[11] Patent Number: 5,543,803
[45] Date of Patent: Aug. 6, 1996

[54] FAIL SAFE RECEIVER SYSTEM

[75] Inventors: Steven E. Serfling, Maple Grove; Rodney L. Stangeland, Plymouth, both of Minn.

[73] Assignee: Honeywell Inc., Minneapolis, Minn.

[21] Appl. No.: 294,668

[22] Filed: Aug. 23, 1994

[51] Int. Cl.$^6$ .................................................. G01S 5/02
[52] U.S. Cl. ........................... 342/357; 342/420; 455/63
[58] Field of Search .................................. 342/357, 420; 455/12.1, 63

[56] References Cited

U.S. PATENT DOCUMENTS

| | | | |
|---|---|---|---|
| 5,268,695 | 12/1993 | Dentinger et al. | 342/357 |
| 5,317,323 | 5/1994 | Kennedy et al. | 342/457 |
| 5,347,536 | 9/1994 | Meehan | 375/1 |
| 5,422,813 | 6/1995 | Schuchman et al. | 364/445 |

OTHER PUBLICATIONS

"Design and Flight Test of a Differential GPS/Inertial Navigation System for Approach/Landing Guidance" by Lawrence Valot, Scott Snyder and Brian Schipper Published in the Navigational: General Institute of Navigation, Summer of 1991, vol. 38, No. 2, pp. 103–122.

*Primary Examiner*—Thomas H. Tancza
*Assistant Examiner*—Dao L. Phan
*Attorney, Agent, or Firm*—Charles J. Ungemach

[57] ABSTRACT

A receiver system using antennas which may be effected by reflections or multipath propagation errors wherein the antennas are placed at spaced apart locations and produce outputs which differ due to the difference of locations and which may differ due to the multipath propagation errors, wherein the system corrects for the position differences and eliminates a signal which contains multipath errors to provide a corrected signal.

6 Claims, 1 Drawing Sheet

FAIL SAFE RECEIVER SYSTEM

BACKGROUND OF INVENTION

1. Field of the Invention

The present invention relates to electromagnetic receivers and more particularly to global position receivers employing ground based antennas to receive signals from transmitters positioned on satellites.

2. Description of the Prior Art

In the prior art, ground based receivers for use in global position systems are known. In such systems, a ground based antenna is positioned to receive signals transmitted from satellites and to process such signals for transmission to remote receivers such as located on aircraft for use in determining position. A problem encountered with ground based antennas is that multipath propagation of electromagnetic signals causes errors in the signals produced by the ground based receivers. More particularly, reflections of radiation from the ground and from objects which are above the antenna's horizon cause unwanted interference with the signals received directly from the satellites. Several solutions to this problem have been proposed. For example, in copending application Ser. No. 08/294,519 of Robert Gille, filed on even date herewith and assigned to the assignee of the present invention, protective materials such as choke coils and absorbing materials are placed around the antenna to inhibit the ground and object reflections.

While this provides satisfactory protection in most cases, the output of the antenna may still be in error with the result that erroneous signals may be transmitted to the aircraft.

BRIEF DESCRIPTION OF THE PRESENT INVENTION

The present invention overcomes the problem in the prior art by providing a plurality of antennas located at spaced positions from each other with each producing an output indicative of transmissions from the satellites. Since the position of the signals is slightly different, the signals generated by the receivers will be slightly different. Accordingly, the signals are presented to one or a plurality of differential correction processors which operate in accordance with a predetermined program to correct each signal for the slight position variances of the receivers. The differential correction processor also operates to determine which, if any, of the receiver outputs is in error due to the multipath errors and eliminates it in the production of a resulting output. As is taught and claimed in copending application Ser. No. 08/294,283 of Rod Stangeland filed on even date herewith and assigned to the assignee of the present invention, the use of two or more differential correction processors allows for "fail safe" or "fail operational" systems since the outputs of the three processors, which should all be the same if the processors are operating correctly, may be presented to a voting circuit which will determine any faulty processor output.

DETAILED DESCRIPTION OF THE PREFERRED EMBODIMENT

Figure 1:
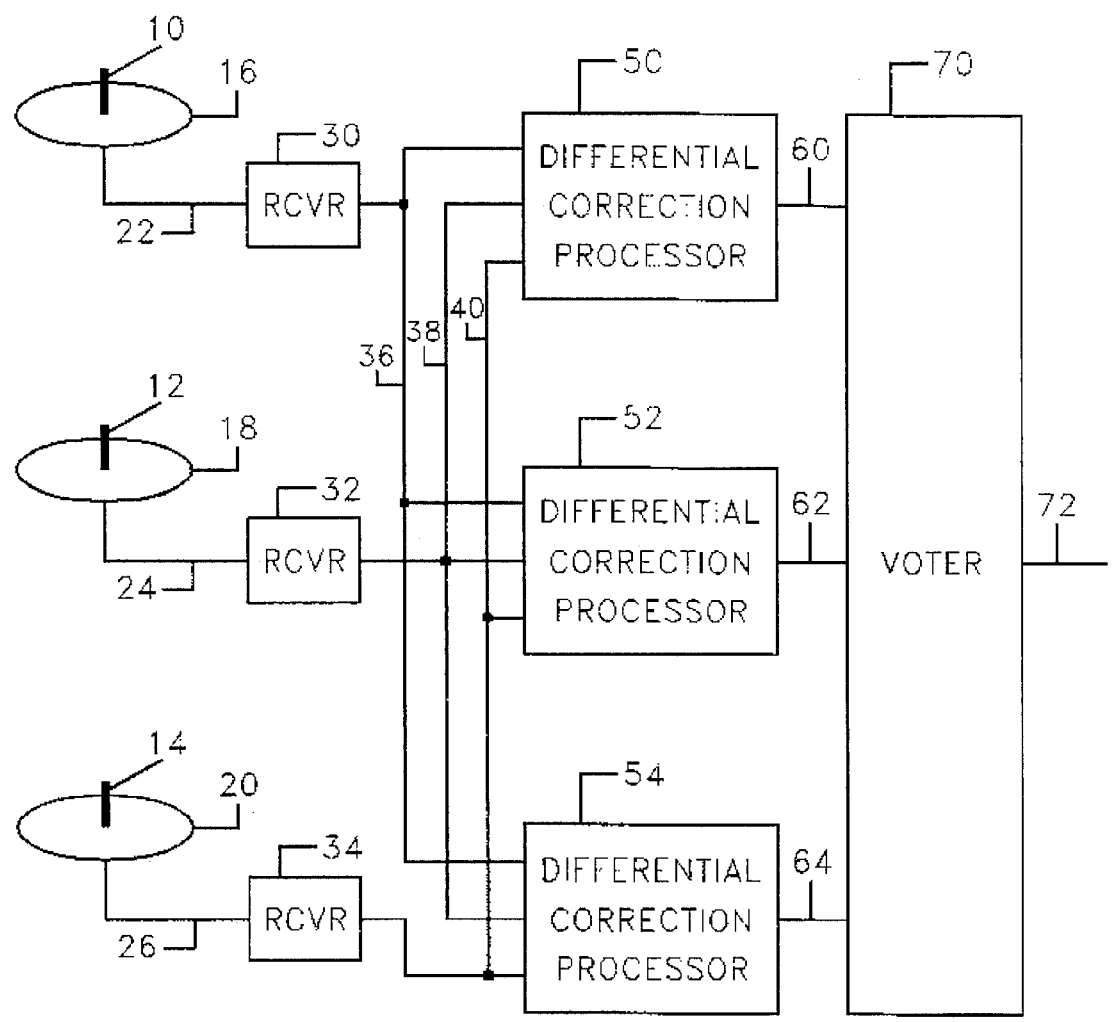
FIG. 1 shows a schematic diagram of the preferred embodiment of the present invention.

In FIG. 1., three antennas 10, 12 and 14 are shown which may be mounted with correcting plates and absorbing materials 16, 18 and 20 respectively in a manner taught in the above mentioned copending application Gille. The antennas will be carefully located around the site at various distances from each other up to around 100 meters, and the positions with respect to one another will be accurately known. Because of the separation of the antennas, and also by choosing the site for the antennas properly, the possibility of reflection signals causing errors is minimized. If there are errors, it will normally effect only one of the antennas or, at least, the other antennas will be effected far less, since they are positioned remote from each other. If the error is persistent, the antenna which is the offending one may be repositioned or, the error corrected by an algorithm which, as will be explained below, is used to adjust the outputs in accordance with the difference in positions.

The outputs of the antennas 10, 12, and 14 are presented via lines 22, 24 and 26 respectively to receivers 30, 32 and 34 respectively. The receivers may be mounted adjacent the antennas or, if desired, more remotely, but the outputs therefrom are presented over lines 36, 38 and 40 to three differential correction processors 50, 52 and 54. It will be noted that the output of each receiver 30, 32 and 34 is presented to all three differential correction processors 50, 52 and 54 so all differential correction processors receive the data from all receivers. As mentioned above, the differential correction processors will be programmed to correct for the differences in position of the three antennas 10, 12, and 14 and will also be programmed to detect which, if any of the receiver outputs contains errors due to multipath propagation. An example of an algorithm and apparatus which can be used to accomplish this may be found in a copending application Ser. No. 08/294,284 of Mats Brenner et al filed on even date herewith and assigned to the assignee of the present invention. Also, a suitable system may be found in an article entitled "Design and Flight Test of a Differential GPS/Inertial Navigation System for Approach/Landing Guidance" by Lawrence Valot, Scott Snyder and Brian Schipper which has been published in the Navigational: General of Institute of Navigation, Summer of 1991, Volume 38, No. 2, Pages 103–122. Of course, if fail safe or fail operational operation is not needed, only one differential correction processor is needed.

If the differential processors 50, 52 and 54 all operated accurately, then the output 60, 62 or 64 of any one of them could be used as the final corrected output. However, if a fail safe or fail operational system is desired to determine if one of the differential correction processors was operating erroneously, as in the above mentioned copending Stangeland application, the outputs of the differential correction processors on lines 60, 62 and 64 may be presented to a voter circuit 70 which may be of standard design well known in the art. Voting circuit 70 will compare the outputs of the differential correction processors 50, 52 and 54 and determine which, if any, is in error and produce a final resulting output on line 72. If there is no error found, the output from voter 70 on a line 72 will be the same as the values compared. If there are only two differential correction processors, and one of the outputs is determined to be in error, then the system is "fail safe" and the output on line 72 would indicate that no valid output can be produced. If three or more differential correction processors are used, the voter 70 will discard any faulty output and the system is "fail operational" with the resulting output on line 72 being the same as the correct majority. In any event, the output on line 72 is then used to provide the information to be sent to the aircraft.

It is seen that I have provided a system for producing a correct output from receivers which obtain information from a remote source and I have eliminated errors that may exist due to multipath propagation. Although the present invention has been described with reference to preferred embodiments, workers skilled in the art will recognize that changes may be made in form and detail without departing from the spirit and scope of the invention.

What is claimed is:

1. The method of determining a correct value for signals from a plurality of receivers each of which produces an output indicative of values received from a remote transmitter but which may contain errors due to multipath propagation comprising the steps of:

A. positioning the receivers at spaced apart locations so that any multipath propagations effect the receivers differently; and B. processing the outputs of the receivers together to determine if there is an error due to multipath propagation and to produce a resultant output indicative of the correct value.

2. The method of claim 1 further including the step of

A1. correcting the output of the receivers for any differences due to the receivers being at different positions.

3. Signal receiving apparatus comprising:

a plurality of receivers positioned at different locations to receive signals transmitted by a remote transmitter and produce outputs in accordance therewith, one of said output possibly being in error due to multipath propagation;

correction circuit means connected to receive and correct the outputs of the receivers together in accordance with the difference in position and to eliminate any receiver outputs which contain multipath propagation errors.

4. Apparatus according to claim 3 wherein, the signal receiving apparatus is part of a global position system and the remote transmitter is a satellite.

5. Apparatus for removing any multipath errors from a transmission received from a GPS satellite comprising:

first and second receivers positioned at spaced apart locations to receive the transmission from the satellite and to produce first and second signals in accordance therewith, the first and second signals being effected by multipath errors differently;

processing means connected to receive both the first and second signals to eliminate any differences due to the receivers being at different positions, and to determine any differences due to multipath errors, said processing means producing a corrected output signal.

6. Apparatus according to claim 5 further including a third receiver positioned to receive the transmission from the satellite to produce a third signal, said processing means receiving the first second and third signals to produce the corrected output signal.

\* \* \* \* \*